2,721,862

SULFURIZED TERPENES AND THREE STEP PROCESS FOR MAKING SAME UTILIZING SULFURIZATION PROMOTERS

Elmer W. Brennan, Chicago, Ill., assignor to The Pure Oil Company, Chicago, Ill., a corporation of Ohio No Drawing. Application December 30, 1949, Serial No. 136,157

7 Claims. (Cl. 260—139)

This invention relates to the sulfurization of isoprenoid compounds having an alicyclic structure, i. e., the various terpenes including both mono- and dicyclic terpenes. More specifically, the invention relates to a method of preparing sulfur containing derivatives of the terpenic hydrocarbons by a novel method of promoting the reaction of the terpenes with sulfurizing agents with the result that the end product contains more sulfur than can be added by the usual methods of sulfurization and the reaction is not accompanied by excessive sludging or polymer formation.

The reaction of isoprenoid compounds with sulfurizing agents, and in particular, free sulfur has long been practiced to yield a product which when compounded with lubricating oils imparts desirable properties to the composition, such as, oxidation stability and non-corrosiveness to alloy bearings. The direct addition of sulfur to isoprenoid compounds is generally recognized to be one of the addition of the sulfur to the double bonds present in the molecule and a splitting off of water with those isoprenoids containing oxygenated groups. The products resulting from the reaction are complex and have been identified only partially as mono-, di- and tetra-sulfides of the terpenic molecule. The sulfurization art has long recognized the importance of placing sulfur in the organic molecule in a form which is non-corrosive and yet active for the purposes desired. Ordinary sulfurization methods do not in all instances accomplish this result since uncombined sulfur is often present in the product, which crystallizes out when the reaction mass is cooled or the product may lose its free sulfur after it has been compounded with a lubricating oil. With certain starting materials, like the terpenes, the reaction may produce a product containing corrosive sulfur in the form of hydrogen sulfide incorporated in the reaction mass or a portion of the terpene may react to produce monosulfides and mercaptans which are also corrosive. If water is formed during the reaction there results the formation of sulfurous acids in the presence of sulfur in this corrosive state and the undesirability of the product is increased. In addition, the presence of water in the product tends to produce a cloudy appearance in the final composition with the lubricating oil with the result that it is unmarketable or may become so on standing or storage. Often when the sulfurization reaction is conducted at too high a temperature the terpene molecules are partially cracked and these cracked products tend to reduce the flash point of the final product.

Many attempts of greater or lesser success have been made to improve the product of the sulfurization of terpenic hydrocarbons. If steam distilled pine oil, a typical terpene obtained from the distillation of crude turpentine and having as its main constituent alpha-terpineol, B. P. about 422° to 424° F., being an alcohol of the cyclohexane series often designated as a monocyclic terpene, is heated with elementary sulfur, as the temperature rises the sulfur melts and begins to dissolve in the pine oil. At about 350° F. ebullition takes place and an exothermic reaction sets in with consequent rise in temperature to about 375° F., at which point the sulfur is dissolved and homogeneity is reached. If this mass is cooled the sulfur tends to crystallize out and the product will have a low sulfur content and a high polymer content, in addition to exhibiting most of the other undesirable characteristics aforementioned. By prolonged heating of the sulfur and pine oil after homogeneity some of these difficulties aforementioned can be eliminated. What has been said of pine oil is generally true of the other members of the class of isoprenoid compounds. Although numerous methods have been found to eliminate most of the difficulties enumerated, the means employed are often tedious, time-consuming and expensive.

A method of sulfurizing terpene hydrocarbons has been discovered comprising heating terpenes with a sulfurizing agent, at a temperature of at least the melting point of sulfur and not below the temperature at which free sulfur precipitates, until homogeneity is reached, then accelerating or promoting the reaction by controlled addition of a promoter selected from the group of phosphorus sulfides, phosphorus halides and sulfur halides.

Accordingly, it is the main object of this invention to provide a method of sulfurizing terpene hydrocarbons wherein the reaction is characterized by its smoothness and the final product displays a preponderance of desirable characteristics.

It is a second object of this invention to provide a method of promoting the sulfurization of terpene hydrocarbons and particularly mono- and dicyclic terpenes.

It is a third object to provide a promoter for the sulfurization of terpenes and a method of conducting the promoted reaction.

It is a fourth object of this invention to provide a method of sulfurizing terpenic hydrocarbons by employing the incremental addition of a promoter during the reaction.

A fifth object of this invention is to provide as sulfurization promoters various agents, such as, phosphorus sulfides, phosphorus chlorides, sulfur chlorides, and the like.

A sixth object of this invention is to provide a method of conducting sulfurization reactions wherein the temperature of the reaction is closely controlled with the result that the characteristics of the final product are enhanced in that its sulfur and phosphorus content is high and the amount of polymer formed is small.

Other objects of this invention will part be apparent and in part appear by implication as the description thereof progresses.

Briefly it has been discovered that the sulfurization of terpenes can be promoted and the product improved by the incremental addition of a promoter during the reaction under controlled conditions of time and temperature. The promoters contemplated fall within the general class of phosphorus sulfides, phosphorus halides and sulfur halides. The phosphorus containing compounds which may be used to promote the sulfurization of terpenes in accordance with this invention include phosphorus sulfides, such as phosphorus pentasulfide and phosphorus sesquisulfide, the phosphorus halides, such as phosphorus trichloride, phosphorus pentachloride, and corresponding iodides and bromides, phosphorus sulfochlorides, such as thiophosphoryl chloride and phosphorus oxyhalides, such as phosphorus oxychloride. The sulfur halides include sulfur monochloride, sulfur dichloride and sulfur bromide. Mixtures of any two or more of these promoters may also be used.

The manner of conducting the process of the present invention comprises mixing the terpene and sulfurizing agent thoroughly and heating the mixture at atmospheric pressure to a temperature of about 200° to 280° F. Proportions of sulfurizing agent and terpene are adjusted so that there is approximately enough sulfur present to yield a product containing about 32% final sulfur when the product is thoroughly purified and all unreacted low boiling constituents removed. Whether or not the product is purified will depend on the use to which it is placed. In general, cutting oil additives do not require strict purification while lube oil additives will require some purification. The total elemental and combined sulfur used should be at least equal to the amount stoichiometrically necessary to combine with the terpene, but an excess of from 5 to 10% of elemental sulfur over the stoichiometric requirements is preferred. This excess will be proportionately less when using a sulfur-containing promoter which also enters into the reaction. The temperature of preheating will depend on the nature of the terpene compound being treated and the ease with which homogeneity is reached.

A typical commercial terpene is a product by the Hercules Powder Company, referred to by its trade name Dipentene 122. This is a mixture of mono- and dicyclic terpenes including dipentene, alpha terpinene, terpinolene, alpha pinene, beta pinene and 2,4 (8) para-menthadiene, with considerable amount of para-cymene and para-menthane. When Dipentene 122 is treated with a sulfurizing agent, as for example, sulfur, the initial heating is carried to a temperature of about 240° F. With most terpenes including Dipentene 122 there is little or no reaction at this temperature, the reaction not being truly exothermic until either the temperature has been raised to about 350° F., or a promoter is added in accordance with this invention at a temperature of about 240° to 248° F. The temperature of preheating the reaction mass need not go much beyond 240° F. since sulfur melts at 248° F. and dissolution of the sulfur in the terpene takes place between 240° and 348° F. It is necessary to maintain the reaction mass at a temperature of at least about 240° F. in most cases since there is danger of precipitation of the sulfur at lower temperatures. The mass at this point will exhibit some homogeneity and small portions of the promoter, as phosphorus pentasulfide are then added at such a rate to maintain the reaction temperature within certain prescribed limits.

The proportion of each increment of promoter added may be approximately 20% of the total quantity of promoter it is contemplated will be employed. This proportion may be varied as the conditions of the reaction indicate, and, therefore, smaller or larger increments of promoter may be employed. When the promoter used is a liquid it may be added continually or dropwise during the reaction. By observation of the temperature of the reaction, the amount and rate of promoter can be adjusted and additions made only when a drop or lag in temperature is observed. The reaction temperature is maintained within the general range of 240° to 300° F. depending on the rapidity of the reaction and the amount of heat given off or required to be added during the reaction. The reaction in the presence of promoter is normally exothermic and the success of the method depends on the proportion of promoter used in each addition, the length of time intervening between additions of promoter, and the average temperature to which the reaction is allowed to rise. It has been found that the length of time between incremental additions of promoter will vary with the quantity of initial starting materials used, the temperature of the initial heating and the nature of promoter used. Generally the time lapse between increments of the promoter will be from 3 to 15 minutes except when the promoter is added continuously at a controlled rate. During the entire process the reaction mass is maintained in a constant state of agitation either by the use of mechanical stirrers or through the convection currents due to the application of heat.

At the end of the final addition of promoter the reaction mass retains its temperature of 240° to 300° F. a period of about 30 minutes to one hour after which time the temperature begins to subside. At the first evidence of subsidence of the temperature the exothermic reaction is raised to and maintained at about 300° to 375° F. for a time to yield a product having practically no corrosive sulfur. For Dipentene 122 this final temperature is about 330° to 340° F. and the time required during this final period to yield a product which is free from active sulfur is about 4 hours as determined by a copper strip corrosion test at 330° F. for one minute. The final product will contain from 25 to 35% sulfur and from 2 to 3% of phosphorus.

The copper strip test is made after the final addition of promoter and after the reaction mass has been subjected to at least a partial heating to a temperature of at least about 300° F. The copper strip test is conducted by immersing a polished copper strip in the reaction mixture for one to three minutes while the latter is maintained at a constant temperature of 300° or 330° F. The test gives an indication of the activity of the sulfur present at the temperature of the test and serves as a guide to the chemical characteristics and possible applications of the product. For example, the test results may vary all the way from a "peacock" or iridescent colored strip to a gray or black strip with a loosely bound scale. Intermediate between these two extremes will be found strips exhibiting a tightly bound black coating. A compound which gives a "peacock" test would be useful as a lubricating oil additive. Those products which exhibit a tightly bonded gray or black coating may be applied in the compounding of lubricating and gear oils. A loose black coating on the copper strip is indicative of the presence of active sulfur at the temperature of test. A compound with such a characteristic would be useful in formulating cutting oils.

In order to more completely explain the nature of the present invention the following examples are given:

*Example 1.*—85% by weight Dipentene 122 and 15% by weight sulfur were mixed and heated at atmospheric pressure under reflux for 30 hours. During the reaction and at the completion of the experiment the reaction product contained a large quantity of free sulfur and unreacted dipentene. The product was not compatible with mineral oil and exhibited a precipitation in the form of polymer insolubles when added thereto. The same result was obtained when using 70% by weight of Dipentene 122 and 30% by weight of sulfur for the reaction. The product displayed a very loose black scale on subjection to the copper strip test.

*Example 2.*—58% by weight of dipentene and 42% by weight of sulfur were heated together at atmospheric pressure under reflux. After 30 hours of heat at 335° to 348° F. the product contained a large amount of free sulfur and unreacted dipentene. In addition the product was unfit for use with a mineral oil due to its polymer content, color and loose black scale on copper strip test.

*Example 3.*—A mixture of 1950 grams Dipentene 122 and 750 grams sulfur were heated to 240° F. at atmospheric pressure until homogeneity resulted. Then a total of 300 grams of phosphorus pentasulfide was added in five increments of 60 grams each in about 12-minute intervals. This rate of addition was sufficient to maintain the temperature between 240° to 280° F. After final addition of the phosphorus pentasulfide, the temperature was raised to and maintained at 330° to 340° F. for 4 hours. A tightly bonded black coating was had when a copper strip corrosion test was conducted for one minute at 330° F. The product contained 31% sulfur and 2.60% phosphorus. The reaction was easily controlled by the incremental addition of the phosphorus pentasulfide and on addition of the final product to a lubricating oil there was less oil-insoluble material than in the case of the material made in accordance with Examples 1 or 2.

On subsequent repeat runs of this experiment it was observed that it is possible to add the first two portions (or 120 grams) of phosphorus pentasulfide almost simultaneously without experiencing too great a rise in temperature, but upon the addition of the third portion after 12 minutes, the activity of the reaction was increased with consequent rise in temperature to about 280° F. Then, upon the addition of the three remaining portions of phosphorus pentasulfide in 6-minute intervals, the reaction was readily maintained at about 265° to 280° F. with no apparent detriment to the final product. This practice allowed for the completion of the promotion period of the reaction in about 30 minutes.

*Example 4.*—1300 grams of Dipentene 122 and 600 grams of sulfur were mixed together and heated to 240° F. at atmospheric pressure. A total of 100 grams of sulfur monochloride was then added dropwise at the rate of 1 drop per 3 seconds continuously over a period of about 33 minutes. At this rate of addition of promoter the heat of reaction was maintained at a point where the temperature did not exceed 280° F. and did not fall below 240° F. After the final addition of sulfur monochloride, heat was applied to the reaction mass and the temperature brought to and maintained at 300° to 350° F. for four hours. At the end of this time a sample of the product yielded a loose black coating on a polished copper strip after one minute contact at 300° F. The product on analysis contained 30.0% sulfur and 1.08% chlorine and was compatible with mineral lubricating oil showing no polymer insolubles.

*Example 5.*—71.6 parts by weight of Dipentene 122 and 21.4 parts by weight of sulfur were mixed and heated to 240° F. at atmospheric pressures. 7.0 parts by weight of liquid phosphorus trichloride, based on the weight of the total mixture was then added very slowly and continuously to maintain the reaction temperature at 240° to 280° F. The technique employed during the addition of the promoter was to allow it to enter the reaction dropwise with close observation of the temperature. When a temperature lag was observed the rate of addition of promoter was increased and as soon as the temperature was seen to be increasing, the rate of addition of promoter was either stopped altogether or adjusted to maintain the temperature constant. The observation was made that during the initial dropwise addition of promoter there was a noticeable increase in temperature. This response to the promoter diminished in magnitude as the reaction progressed. After all of the phosphorus chloride had been added, heat was applied and the temperature of the reaction mass brought to and maintained at 300°±5° F. for about 4 hours. The product gave a light stain in the copper strip test at 300° F. and showed 1.49% phosphorus, 5.66% chlorine and 22% sulfur on analysis.

From the above examples it is apparent that by the stepwise or continuous slow addition of the promoter to the reaction of a terpene and a sulfurizing agent the reaction can be brought to completion in a shorter time, the sulfur is more tightly bonded in the terpene molecule and the product is more compatible with a hydrocarbon oil. In addition, the final product is further improved in that it contains a higher percent of sulfur and a smaller percent of chlorine and phosphorus, or of chlorine alone, than sulfurized products prepared without the use of promoters. The products can be used as prepared for additives in lubricating or cutting oils or may be stripped of any unreacted or low boiling materials before such use. Clay filtration may be used to improve the color characteristics. The products impart oxidation resistance to the compounded oils thereby increasing their life and usefulness.

The process of the present invention has been demonstrated using Dipentene 122 as the isoprenoid hydrocarbon, however, the process is equally applicable to all of the monocyclic and dicyclic terpenes which are reactable with a sulfurizing agent at a temperature of about the melting point of sulfur to a temperature approximating the boiling point of the terpene. Atmospheric pressures have been specified throughout the examples although the reaction may be conducted at subatmospheric or superatmospheric pressures. By incremental addition of promoter as used in the above description and appended claims is meant the portion-wise addition or a series of regular additions of equal or proportionate amounts of promoter. The total amount of promoter used may be from 5% to 15% by weight based on the total weight of all ingredients of the reaction.

The invention having been described in its preferred embodiments and examples given to illustrate the use and effectiveness of the same, I claim as my invention all that is commensurate with the following claims:

What is claimed is:

1. The method of sulfurizing terpene hydrocarbons selected from the group consisting of monocyclic and dicyclic terpenes and their mixtures comprising heating said terpene hydrocarbons, with an amount of sulfur sufficient to yield a final product having a sulfur content of about 25 to 35 per cent by weight, to a temperature of about 240° F. to 248° F. to cause the homogeneous solution of said sulfur in said terpenes, adding incremental amounts of a promoter selected from the group consisting of phosphorus sulfides, phosphorus halides, and sulfur halides, and their mixtures, to said homogeneous mass at a rate sufficient to maintain an exothermic reaction temperature between about 240° and 280° F., the total amount of said promoter being about 5 per cent by weight based on the reactants, raising the reaction temperature after the completion of the addition of said promoter to about 300° to 375° F. and maintaining said last mentioned temperature until a product exhibiting good copper strip corrosion test is obtained.

2. The method in accordance iwth claim 1 in which the terpene hydrocarbon comprises a mixture including dipentene, alpha terpinene, terpinolene, alpha pinene, and beta pinene.

3. The method in accordance with claim 1 in which the promoter is phosphorus pentasulfide.

4. The method in accordance with claim 1 in which the sulfur is present in 5 to 10 per cent by weight excess of stoichiometric requirements.

5. A lubricating oil additive comprising the reaction product resulting from heating terpene hydrocarbons selected from the group consisting of monocyclic and dicyclic terpenes and their mixtures and sulfur to a temperature of about 240° F. to 248° F. until a homogeneous solution of said sulfur in said terpene hydrocarbons is obtained, said sulfur being present in an amount sufficient to yield a final product having a sulfur content of about 25 to 35 weight per cent, followed by adding incremental amounts of a promoter selected from the group consisting of phosphorus sulfides, phosphorus halides, and sulfur halides, and their mixtures, to said homogeneous solution at a rate sufficient to maintain an exothermic reaction temperature between about 240° and 280° F., the total amount of said promoter being about 5 per cent by weight based on the reactants, raising the reaction temperature after completion of the addition of said promoter to about 300° to 375° F. and maintaining said last mentioned temperature until a product exhibiting good copper strip corrosion test is obtained.

6. The lubricating oil additive in accordance with claim 5 in which said terpene hydrocarbon is a mixture including dipentene alpha terpinene, terpinolene, alpha pinene, and beta pinene, and said reaction is completed at a temperature of 330° to 340° F. until a product yielding good copper strip corrosion test is obtained when a test sample of said product is subjected to copper strip test at 300° F. for one minute.

7. The lubricating oil additive in accordance with claim 6 in which the promoter used to prepare same is phosphorus pentasulfide.

References Cited in the file of this patent

UNITED STATES PATENTS

| | | |
|---|---|---|
| 1,964,983 | Gallsworthy | July 3, 1934 |
| 2,076,875 | Borglin et al. | Apr. 13, 1937 |
| 2,316,087 | Gaynor et al. | Apr. 6, 1943 |
| 2,378,803 | Smith | June 19, 1945 |
| 2,380,072 | Reid | July 10, 1945 |
| 2,398,271 | Zimmer et al. | Apr. 9, 1946 |
| 2,402,685 | Signaigo | June 25, 1946 |
| 2,413,648 | Ott | Dec. 31, 1946 |
| 2,424,402 | Loane et al. | July 22, 1947 |
| 2,515,222 | Hoock | July 18, 1950 |
| 2,571,737 | Manteuffel et al. | Oct. 16, 1951 |
| 2,619,482 | Beare et al. | Nov. 25, 1952 |
| 2,654,711 | Kirshenbaum et al. | Oct. 6, 1953 |
| 2,654,712 | Cyphers et al. | Oct. 6, 1953 |